United States Patent [19]
Valentine

[11] Patent Number: 6,157,640
[45] Date of Patent: *Dec. 5, 2000

[54] PROVIDING FEATURE LOGIC CONTROL IN PARALLEL WITH VOICE OVER A SINGLE SUBSCRIBER ACCESS

[75] Inventor: Eric Lee Valentine, Plano, Tex.

[73] Assignee: Ericsson Inc, Research Triangle Park, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/670,815

[22] Filed: Jun. 25, 1996

[51] Int. Cl.⁷ ....................................... H04J 3/12
[52] U.S. Cl. .................... 370/384; 370/496; 370/526; 379/212
[58] Field of Search .................. 370/259, 264, 370/271, 373, 384, 522, 526, 524, 525, 528, 496; 379/352, 355, 350, 361, 201, 207, 220, 202, 205, 142, 196, 211–215, 93.02

[56] References Cited

U.S. PATENT DOCUMENTS

| | | | |
|---|---|---|---|
| 3,997,731 | 12/1976 | Wilmot et al. | 179/18 B |
| 4,232,199 | 11/1980 | Boatwright et al. | 179/18 B |
| 4,747,127 | 5/1988 | Hansen et al. | 379/94 |
| 4,897,866 | 1/1990 | Majmudar et al. | 379/94 |
| 4,903,292 | 2/1990 | Dillon | 370/496 |
| 4,922,490 | 5/1990 | Blakley | 379/215 |
| 5,195,131 | 3/1993 | Sano | 379/215 |
| 5,228,080 | 7/1993 | Nutter et al. | 379/142 |
| 5,263,084 | 11/1993 | Chaput et al. | 379/142 |
| 5,305,312 | 4/1994 | Fornek et al. | 370/264 |
| 5,390,232 | 2/1995 | Freeman et al. | 379/15 |
| 5,396,548 | 3/1995 | Bayerl et al. | 379/142 |
| 5,402,477 | 3/1995 | McMahan et al. | 379/201 |
| 5,434,906 | 7/1995 | Robinson et al. | 379/67 |
| 5,448,631 | 9/1995 | Cain | 379/201 |
| 5,473,671 | 12/1995 | Partridge, III | 379/127 |
| 5,475,746 | 12/1995 | Miller et al. | 379/201 |
| 5,497,414 | 3/1996 | Bartholomew | 379/142 |
| 5,619,561 | 4/1997 | Reese | 379/142 |
| 5,649,003 | 7/1997 | Kapsales et al. | 379/201 |

FOREIGN PATENT DOCUMENTS

| | | |
|---|---|---|
| 0 216 381 A2 | 4/1987 | European Pat. Off. . |
| 43 12 362 A1 | 10/1993 | Germany . |
| WO 85/00487 | 1/1985 | WIPO . |
| WO 96/11542 | 4/1996 | WIPO . |

OTHER PUBLICATIONS

International Search Report for PCT/US 97/10201, dated Jun. 19, 1998.

ITU–T, *General Recommendations on Telephone Switching and Signalling—Intelligent Network*, Mar. 1993, pp. 1–110.

*Primary Examiner*—Chau Nguyen
*Assistant Examiner*—Soon-Dong Hyun
*Attorney, Agent, or Firm*—Jenkens & Gilchrist

[57] ABSTRACT

Whenever a subscriber associated with a plurality of subscriber features receives or originates a call, an application module associated with the serving local exchange links into the established call. The application module thereinafter intercepts all incoming calls towards that subscriber and transmits control data over the existing call connection to the subscriber terminal informing it of the new incoming call. The control data are transmitted over the existing call connection using out-of-band voice frequencies or during silent portions of the speech connection. Over the same existing call connection, the application module receives an instruction from the subscriber terminal for providing a particular terminating call treatment for this incoming call. The application module then provides the instructed terminating call treatment as instructed by the subscriber. Such a treatment may include call forwarding to a third subscriber, the enablement of call waiting, forwarding of the call to a voice mail, and similar subscriber services.

17 Claims, 4 Drawing Sheets

PROVIDING FEATURE LOGIC CONTROL IN PARALLEL WITH VOICE OVER A SINGLE SUBSCRIBER ACCESS

BACKGROUND OF THE INVENTION

1. Technical Field of the Invention

The present invention relates to a subscriber feature within a telecommunications system and, in particular, to a subscriber feature for providing different terminating call treatments for incoming calls toward a particular subscriber terminal.

2. Description of Related Art

As stored program controlled (SPC) switching systems have evolved, a wide variety of useful subscriber features have been developed to extend the communication capabilities such systems provide. One example is call forwarding where a subscriber provides a "forward to" directory number to the switching system and the switching system thereafter forwards all incoming calls for the subscriber to the designated "forward to" number. Other examples of subscriber features include call waiting, voice mail, call conferencing, call transfer, and automatic callback. Due to low subscription costs and added subscriber capabilities provided by these subscriber features, normal telecommunications subscribers usually have more than one subscription to such subscriber features.

However, even with the advancement of such SPC switching systems and subscriber features, many telecommunications subscribers find the interaction of the above subscriber features confusing and limiting. For example, if a subscriber is already in speech connection, all subsequent incoming calls will be provided with the same terminating call treatment by a particular one of the subscriber features enumerated above. As an illustration, if two or more incoming calls are received by a busy subscriber who has both call waiting (CAW) and call forwarding on busy (CFB) features activated, there is currently no mechanism to selectively provide a different terminating call treatment to the received incoming calls. The subscriber service features are not able to selectively forward one particular incoming call to a "forward-to-number", yet allow another incoming call to call wait on the existing connection based upon a discriminating review of the calling party numbers associated with the two incoming calls.

A number of implementations have been proposed to alleviate some of the limitations of the existing systems as illustrated by the above problem. One implementation enables a telecommunications subscriber to selectively assign a group of directory numbers to each subscriber feature. For example, a first group of directory numbers are assigned to the call waiting feature and a second group of directory numbers are assigned to the call forwarding feature. If an incoming call is received from a caller having a directory number contained within the first group, the call waiting service is provided. Similarly, if an incoming call is received from a caller having a directory number contained within the second group, the call forwarding service is instead provided for that particular incoming call. Although the above implementation enables a telecommunications subscriber to selectively associate a particular subscriber feature with a specific calling party number, it still has certain undesirable characteristics.

For the above implementation, the subscriber must have previously inputted all relevant directory numbers into the switching system and have manually associated those numbers with a particular subscriber feature. Accordingly, if an incoming call is received from a directory number not identified by any one of the previously stored directory numbers, the switching system has no means to determine which one of the available subscriber features to apply. The same is true if no number is delivered by the network. Furthermore, if the subscriber wishes to rearrange or modify a directory number assigned to a particular subscriber feature, such modifications must be made manually by the subscriber to the switching system before the desired operation is provided.

Accordingly, there is a need for a mechanism to enable a telecommunications exchange to more flexibly provide terminating call treatments to incoming calls.

SUMMARY OF THE INVENTION

The present invention discloses a method and apparatus for selectively providing a terminating call treatment to an incoming call. Whenever a first incoming call towards a subscriber terminal is received by the serving local exchange, a control module for providing different call treatments is invoked. The control module establishes a call connection with the subscriber terminal and transmits control data informing the subscriber terminal of the first incoming call. Thereinafter, the control module receives an indication from the subscriber terminal instructing the serving local exchange to provide a particular terminating call treatment for the first incoming call. The control module then accordingly provides the first incoming call with the selected call treatment. If a second incoming call towards the subscriber terminal is received by the local exchange while the subscriber terminal is connected to the first incoming call, the local exchange again invokes the control module. The control module transmits control data to the subscriber terminal over the existing call connection informing the subscriber terminal of the second incoming call. A subscriber instruction may again be transmitted by the subscriber terminal to instruct the serving local exchange to provide a particular terminating call treatment to the second incoming call. In response to the receipt of such an instruction from the subscriber terminal, the control module again provides the terminating call treatment specified by the subscriber instruction to the second incoming call. Such instructed treatments may include forwarding it to another subscriber terminal, providing call waiting on the existing call connection, and forwarding it to a voice mail system.

In one embodiment, the control module is an application module within the local exchange serving the subscriber terminal.

In another embodiment, the control module is a separate telecommunications node connected to the serving local exchange.

In still another embodiment, the control data received by the subscriber terminal are displayed on a display unit attached to the subscriber terminal and the subscriber manually inputs the instruction via a keypad.

In yet another embodiment, a desired instruction correlated with a particular calling party number is stored in a register associated with the subscriber terminal. Upon receiving control data informing the subscriber of the occurrence of an incoming call from that particular calling party number, the subscriber terminal automatically retrieves and transmits the stored instruction to the local exchange.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE PREFERRED EMBODIMENTS

Figure 1:
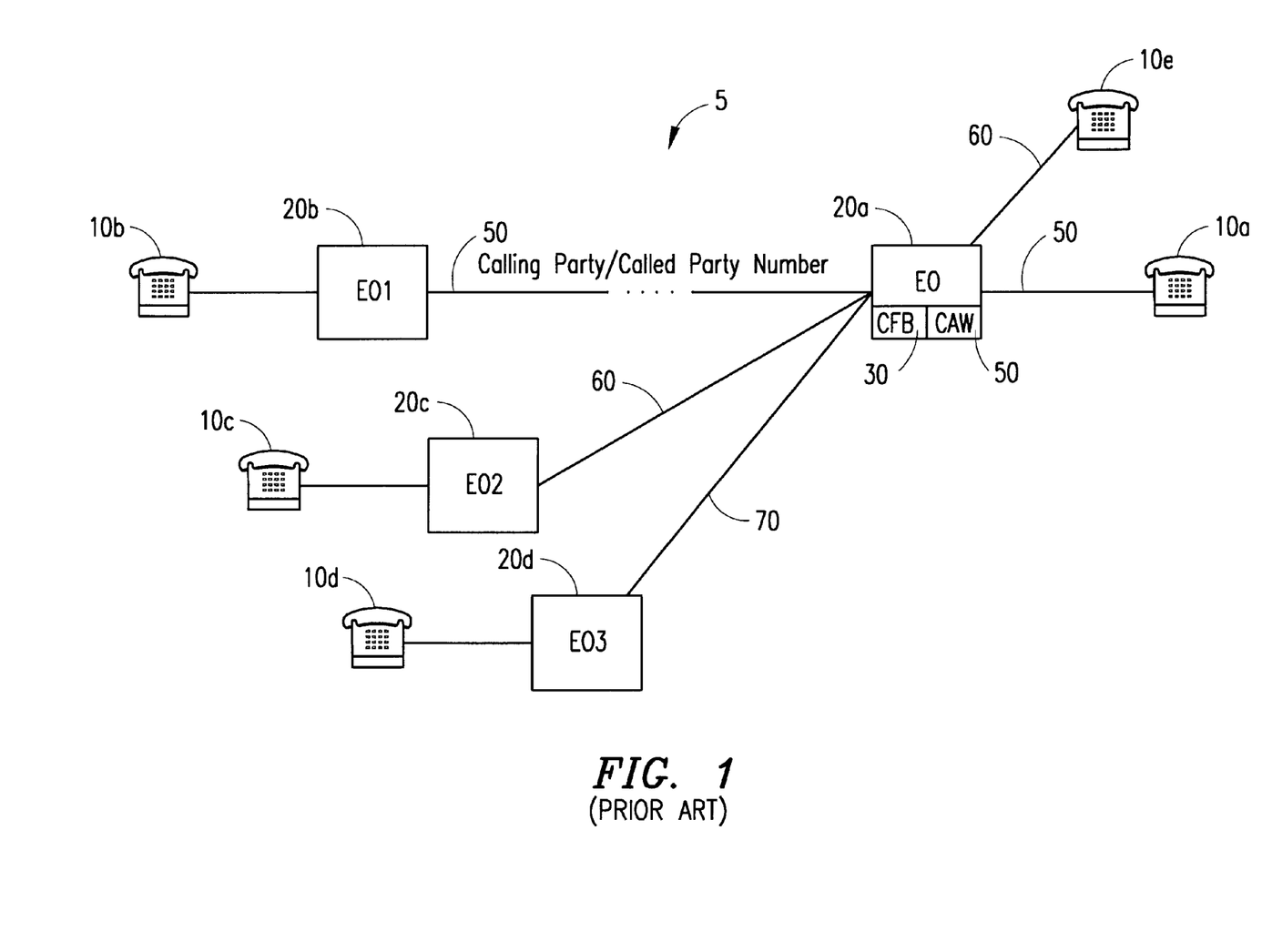
FIG. 1 is a block diagram of a telecommunications network illustrating multiple incoming calls terminating to a particular subscriber terminal.

FIG. 1 is a block diagram of a telecommunications network 5 illustrating multiple incoming calls terminating to a first subscriber terminal 10a. Each of the illustrated subscriber terminals 10a–10d is assigned and served by an associated local exchange or end office (EO) 20a–20d. The associated local exchange is equipped with the necessary hardware and software modules for providing subscriber features to the servicing subscriber terminals. For example, the Call Forwarding on Busy (CFB) module 30 and the Call Waiting (CAW) module 40 within the first local exchange 20a control the necessary hardware and software elements to provide the call forwarding and call waiting functionality to the first subscriber terminal 10a. Accordingly, after activating the CFB module 30 by specifying a forward-to-number by the first subscriber terminal 10a, all incoming calls terminating to the already busy first subscriber terminal 10a will be forwarded to the specified forward-to-number. Similarly, if the first subscriber terminal 10a has the CAW feature activated, the next incoming call will be call waited on the existing call connection instead of being forwarded or denied by the local exchange 20a.

However, even with the advancement of local exchange capabilities and subscriber features, many subscribers find the interaction of the above subscriber features confusing and limiting. For example, if the first subscriber terminal 10a is already in speech connection, all subsequently received incoming calls will be provided the same terminating call treatment by one of the subscriber features associated with the first subscriber terminal 10a. For example, a second subscriber terminal 10b associated with a second local exchange 20b originates an outgoing call connection towards the first subscriber terminal 10a by dialing the directory number assigned to the first subscriber terminal 10a. The second local exchange 20b transmits a call setup signal, such as an initial address message (IAM) signal, to the first local exchange 20a. The transmitted IAM signal requests the destination local exchange 20a to establish a speech connection with the first subscriber terminal 10a. The IAM signal further includes the called party number identifying the first subscriber terminal 10a and the calling party number representing the second subscriber terminal 10b. The idle first subscriber terminal 10a is then alerted and a speech connection 50 is accordingly established between the first subscriber terminal 10a and the second subscriber terminal 10b. Thereinafter, a third subscriber terminal 10c associated with a third local exchange 20c requests another call connection with the first subscriber terminal 10a. A trunk connection 60 between the third local exchange 20c and the first local exchange 20a is established and a second IAM signal is received by the first local exchange 20a. Upon determining that the first subscriber terminal 10a is already in speech connection with the second subscriber terminal 10b, the first local exchange 20a attempts to invoke one of the subscriber features assigned to the first subscriber terminal 10a. For example, upon invoking the CFB subscriber feature, the CFB module 30 retrieves the previously stored forward-to-number from its register and forwards the call connection 60 to a forward-to-subscriber terminal 10e. As a result, the third subscriber terminal 10c is instead connected to the forward-to-subscriber terminal 10e. If another subscriber terminal 10d associated with yet another local exchange 20d subsequently calls the first subscriber terminal 10a, the call is also forwarded to the same forward-to-subscriber terminal 10e by the first local exchange 20a.

Even if the first subscriber terminal 10a has a number of subscriber features activated, because the first local exchange 20a can only provide one particular terminating call treatment towards an incoming call, only one subscriber feature must be selected and invoked by the local exchange 20a. Therefore, while CFB is activated, all other subscriber features associated with the first subscriber terminal 10a cannot be simultaneously utilized. As a result, the first subscriber terminal 10a is not able to forward one particular incoming call to the forward-to-subscriber terminal 10e, yet allow the next incoming call to call-wait on the existing call connection based upon the calling party numbers associated with the incoming calls.

A number of implementations have been proposed to alleviate some of the limitations imposed by the above problem. One such implementation enables the first subscriber terminal 10a to selectively assign a group of calling party numbers to a particular subscriber feature. For example, the directory number representing the third subscriber terminal 10c is assigned to the CFB feature. Similarly, the directory number representing the fourth subscriber terminal 10d is assigned to the CAW feature. Subsequently, the third subscriber terminal 10c originates an outgoing call connection towards the first subscriber terminal 10a who is already in speech connection with the second subscriber terminal 10b. Upon determining that the first subscriber terminal 10a is already busy, the first local exchange 20a compares the received calling party number representing the third subscriber terminal 10c with the previously assigned directory numbers for the CFB and CAWT features. In response to an affirmative determination that the third subscriber terminal's directory number has been selectively associated with the CFB feature, the local exchange forwards the incoming call from the third subscriber terminal 10c to the forward-to-subscriber terminal 10e. On the other hand, if an incoming call is received from the fourth subscriber terminal 10d, a similar determination is made by the first local exchange 20a, and the incoming call is allowed to call wait on the busy first subscriber terminal 10a. As a result, a call waiting tone is transmitted to the first subscriber terminal 10a (three beeps in the United States) and the subscriber can hook-flash to place the existing call on hold and answer the incoming call from the third subscriber terminal 10c.

Even though the above implementation enables a subscriber to selectively associate a particular subscriber feature with a specific calling party number, it still has certain undesirable characteristics. For the above described system to function properly, the first subscriber terminal 10a must have previously inputted all relevant directory numbers to the first local exchange 20a and have manually associated them with corresponding subscriber features. Accordingly, if an incoming call setup signal is received with a directory number not identified by any one of the previously stored directory numbers, the local exchange 20a has no means to determine which one of the available subscriber features to apply. Furthermore, if the subscriber wishes to provide a different terminating call treatment to an already stored directory number, such modification must be made manually by the subscriber to the local exchange 20a before the desired operation is provided.

Figure 2:
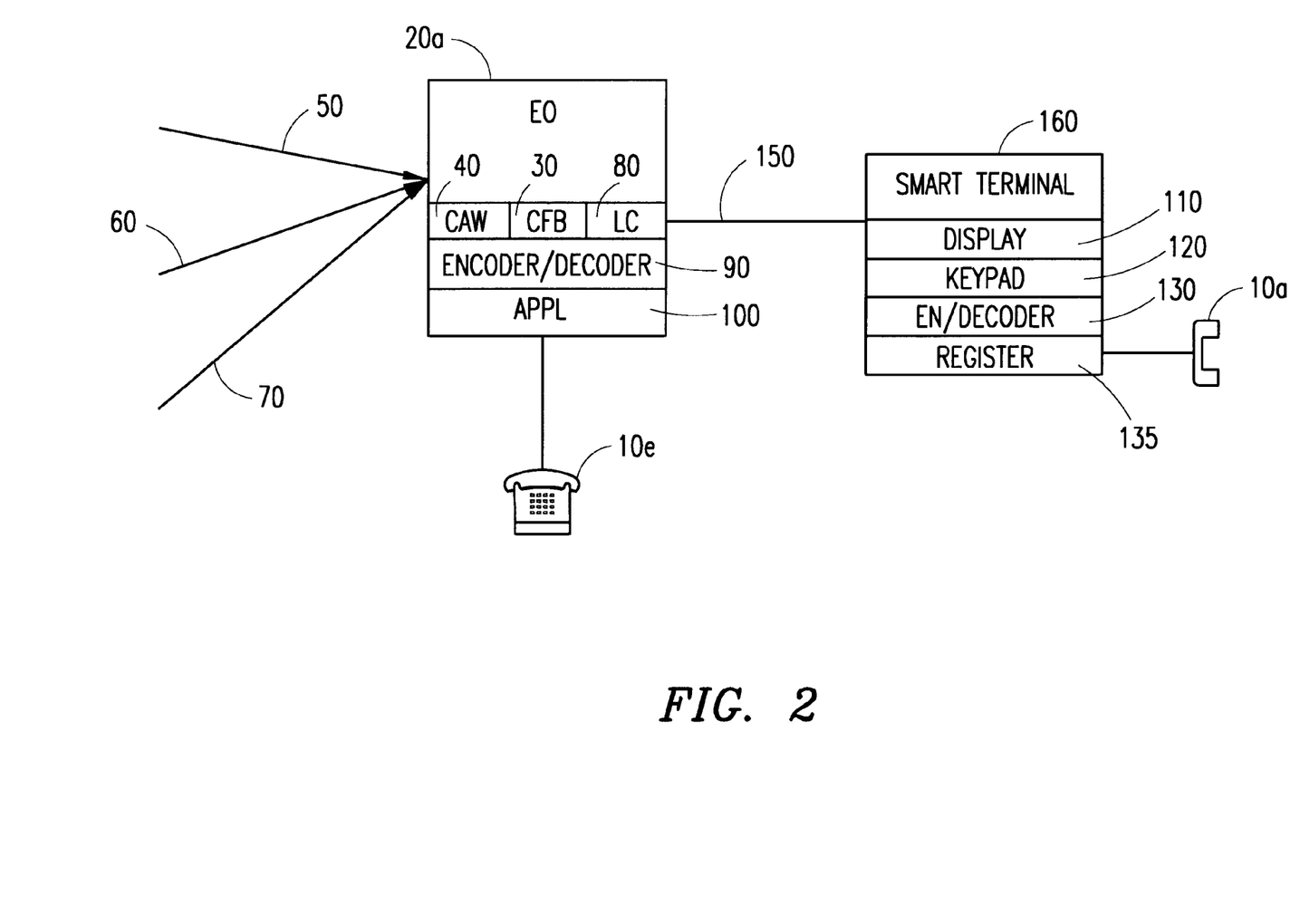
FIG. 2 is a block diagram illustrating an application module within a local exchange serving a particular subscriber terminal providing different terminating call treatments to multiple incoming calls.

Now referring to FIG. 2, there is shown a block diagram illustrating an application module 100 within the first local exchange 20a for providing different terminating call treatments to incoming calls in accordance with the teachings of the present invention. The second subscriber terminal 10b (not shown, see FIG. 1) originates a call connection 50 towards the first subscriber terminal 10a by dialing its assigned directory number. When the IAM signal requesting a call connection is received by the local exchange 20a, instead of alerting and establishing a call connection with the first subscriber terminal 10a, the application module 100 within the local exchange 20a is invoked. The application module 100 retrieves the calling party number included in the received IAM signal and establishes a call connection 150 with a smart terminal 160 associated with the first subscriber terminal 10a. Such a smart terminal 160 may be separately connected to the conventional subscriber terminal 10a or be integrated with a subscriber terminal as a single unit as illustrated in FIG. 2. Without completing the call connection 150 with the incoming call connection 50, the application module 100 transmits control data over the call connection 150 to the smart terminal 160. A first encoder/decoder 130 within the smart terminal 160 receives the transmitted control data, displays the data representing the identity of the incoming calling party number and any other included information onto an attached display unit 110. For example, such a displayed message might show "incoming call from John Doe." The subscriber then instructs the local exchange 20a to provide a specific terminating call treatment for this particular incoming call by inputting the appropriate instruction by means of an attached keypad 120. The user inputted data are further encoded by the first encoder/decoder 130 and transmitted over the call connection 150 towards the first local exchange 20a. As another embodiment of the present invention, a register 135 associated with the smart terminal 160 may already store a user inputted instruction regarding a particular calling party number. If the smart terminal 160 is informed of an incoming call from that particular calling party number, the smart terminal 160 automatically retrieves the stored instruction and transmits it back to the first local exchange 20a.

In response to the received user instruction, this application module 100 provides the instructed terminating call treatment to the received incoming call. Such a treatment may include forwarding the call connection 50 towards the forward-to-subscriber terminal 10e, forwarding the call connection 50 to a voice mail system, or accepting the call and connecting the call connection 50 with the call connection 150.

Thereafter, another incoming call 60 from the third subscriber terminal is received by the local exchange 20a. The application module 100 again intercepts the incoming IAM signal and retrieves the identity of the calling party number. After checking the appropriate line connection (LC) 80, the application module 100 determines that the smart terminal 160 is already busy and transmits control data, informing the smart terminal 160 of the second incoming call. The control data are transmitted over the existing call connection 150 without establishing a separate access line to the smart terminal 160. In order to concurrently transmit the control data with the existing voice data being communicated between the first subscriber and the second subscriber, the control data are transmitted over out-of-band frequencies, i.e., the data are transmitted using the sound frequencies not being utilized by human voice. After reaching the smart terminal 160, the attached first encoder/decoder 130 filters and extracts the control data encoded into the out-of-band frequencies. Another implementation technique for transmitting control data over the existing call connection 150 is that of transmitting the control data during silent portions of the speech conversation being communicated between the first subscriber and the second subscriber. Whenever the application module 100 detects a pause or silence, the control data are communicated between a second encoder/decoder 90 associated with the local exchange 20a and the first encoder/decoder 130 associated with the smart terminal 160. After the transmission, a voice connection between the two human subscribers is re-established. Other well known techniques including packet switching or multiplexing voice and data using time slicing can further be used. All of these methods are already well known within the telecommunications field and will not be described in detail herein. Moreover, as the system and method of the present invention are implementable with any other available technology for communicating voice and data over a single access, it will be understood that the description of the present invention in the context of the out-of-band technology and time sharing technology provided herein is exemplary rather than by way of limitation of the scope of the present invention.

After being displayed another message informing the first subscriber of the second incoming call, the first subscriber again instructs the local exchange 20a via the keypad 120 to provide a certain selected terminating call treatment towards this particular incoming call. Such an instruction may also be retrieved from the register 135 based upon the directory number of the second incoming call and transmittal without informing the subscriber. The data indicative of the user instruction is then encoded by the first encoder/decoder 130 and transmitted over the existing call connection 150 towards the application module 100. In response to the received user instruction, the application module 100 provides the instructed call treatment to the second incoming call. If the first subscriber indicates a wish to answer the call, the application module 100 invokes the CAW module 40 and enables the second incoming call to call wait on the first subscriber. If, however, the first subscriber indicates a wish to forward the call to a particular forward-to-number, the CFB module 30 is invoked and the second incoming call is accordingly forwarded to the preassigned forward-to-subscriber terminal 10e. Similarly, if the first subscriber wishes to record a message, the second incoming call is forwarded to voice mail.

Subsequently, if another call connection 70 is received by the local exchange 20a, the application module 100 again transmits control data to the smart terminal 160 and enables the first subscriber to again selectively provide a desired call treatment to the third call connection 70.

Figure 3:
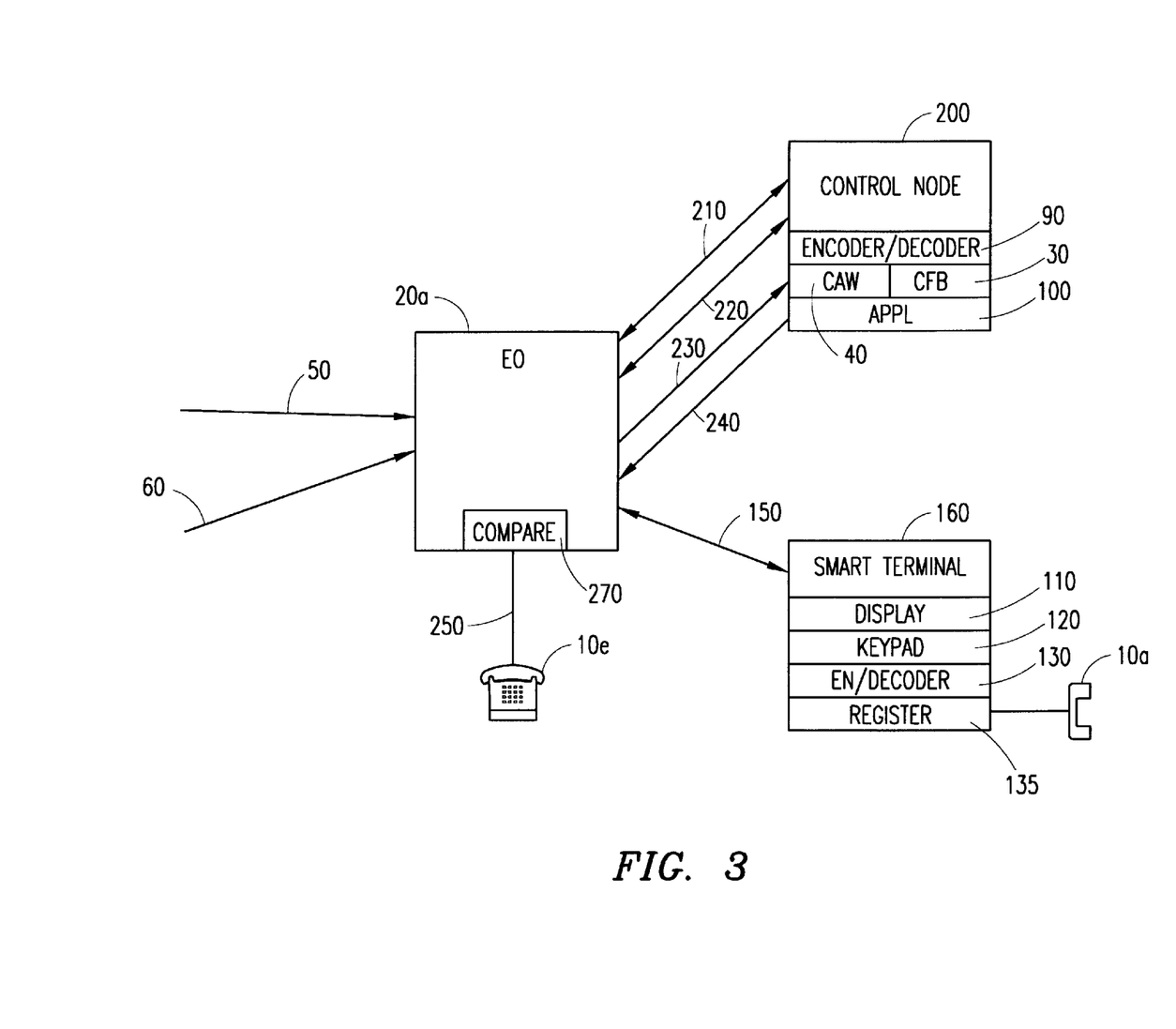
FIG. 3 is a block diagram illustrating a telecommunications node connected to a local exchange providing different terminating call treatments to multiple incoming calls.

As another embodiment of the present invention, FIG. 3 is a block diagram illustrating a separate control node 200 connected to the first local exchange 20a for providing different terminating call treatments to incoming calls. Instead of incorporating the application module 100 (see FIG. 2) into the existing local exchange 20a, the functionality of intercepting incoming calls and transmitting control data is removed from the local exchange 20a and placed in the separate control node 200 connected to the serving local exchange. In accordance with this embodiment of the present invention, a directory or other routing number is assigned to the control node 200. Whenever an incoming call is received by the local exchange 20a, the directory number representing the control node 200 is compared with the calling party number included in the received IAM signal by a comparator 270 within the first local exchange 20a. The comparator 270 determines whether or not the calling party for this particular incoming call is the control node 200. In response to a negative determination, the incoming call is rerouted to the control node 200 as indicated by a call connection 210. After receiving the call connection 210, the control node 200 also establishes a new call leg with the first local exchange 20a as indicated by a call connection 220. Since the new call connection 220 received from the control node 200 has the directory number assigned to the control node 200 as the calling party number, the comparator 270 will thereafter determine that the calling party is the control node 200. If the calling party is the control node 200, the call connection is established by the first local exchange 20a to the smart terminal 160 as indicated by a call connection 150. The purpose of rerouting the incoming calls to the control node 200 is to enable the control node to link into the call connection being established between the calling party and the smart terminal 160. By linking into the very first call connection, the control node 200 can subsequently transmit control data over the existing call connection without requiring additional access to the smart terminal 160. Accordingly, the control node 200 is looped into the call connection by establishing a speech connection between the calling subscriber and the smart terminal via the following path: call connection 50—call connection 210—call connection 220—call connection 150. Thereinafter, the application module 100 within the control node 200 transmits the identity of the original calling party to the smart terminal 160 via the second encoder/decoder 90. The control data transmitted by the application module 100 are transferred transparently through the first local exchange 20a and delivered to the smart terminal 160. Therefore, the first local exchange 20a merely acts as a tandem switch for transporting the control data between the control node and the smart terminal 160. In order to prevent an infinite loop, the comparator 270 within the first local exchange 20a ensures that the call connection signal originated by the control node 200 is not rerouted back to the control node by comparing the calling party number included in the signal with the directory number assigned to the control node 200.

The first encoder/decoder 130 within the smart terminal 160 receives the control data and displays the control message onto the display unit 110. The subscriber reviews the displayed information and then instructs the control node 200 to provide a certain terminating call treatment for this particular incoming call. As described previously, such instructions can also be retrieved from the register 135 storing the previously stored user instruction. In a manner described above, the user inputted instruction is returned to the application module 100 within the control node 200. Depending on the instruction provided by the first subscriber, the application module 100 accordingly provides the instructed call treatment to the first call connection. For example, if the first subscriber has instructed the control node 200 to accept the call, a speech connection between the calling party and the smart terminal 160 is established as a result of the control node connecting the call connection 210 with the call connection 220.

When the second incoming call 60 is received by the local exchange 20a, the comparator again determines that this call is not from the control node 200 and reroutes the second incoming call to the control node 200 via a call connection 230. The control node then determines that the smart terminal 160 is already in speech connection with the first call and transmits control data informing the smart terminal 160 of the second incoming call. The control data are transmitted over the existing call connections 220 and 150. By utilizing the existing call connection, only a single subscriber access is needed to enable the subscriber to selectively provide different call treatments towards incoming calls. The second encoder/decoder 90 again encodes the control data and transmits the encoded data over the call connection 220 to the local exchange 20a. The local exchange 20a, acting as a conduit switch, merely passes the data over to the smart terminal 160 via the call connection 150. The first encoder/decoder 130 within the smart terminal 160 extracts the transmitted control data and displays them onto the display unit 110 for user review. While engaged in speech connection with the first calling party, the subscriber reviews the displayed information and instructs the control node 200 to provide a particular call treatment towards this second incoming call. The user inputted data are transmitted by the first encoder/decoder 130 back to the local exchange 20a over the call connection 150. Since the call connection 150 is rerouted to the control node 200 via the call connection 220, the transmitted user inputted data are received by the control node 200.

Pursuant to the received user instruction, the application module 100 within the control node 200 provides the specified terminating call treatment to the second incoming call. As described previously, the CAW module 40 can be invoked and the second incoming call 60 can call-wait on the existing call connection. On the other hand, the application module 100 can invoke the CFB module 30 to reroute the second incoming call 60 to the forward-to-subscriber terminal 10e via the call connections 240 and 250.

In order for the control node 200 to transmit control data over an existing call connection, whenever an initial call connection is established with the smart terminal 160, the control node 200 must be linked into the call path. For an incoming call, the above described procedure of rerouting the incoming call to the control node by the local exchange is performed. For an outgoing call originated by the smart terminal 160, the first local exchange 20a always reroutes the outgoing call to the control node 200. In a manner similar to the operation of linking into incoming calls as described above, the control node 200 again generates an additional call leg back to the first local exchange 10a to request an outgoing call connection. Since the new outgoing call connection request received by the first local exchange 20a will have the directory number assigned to the control node 200 as the calling party number, the comparator 270 within the local exchange 20a will allow the call to be originated. Accordingly, the control node 200 is linked into the outgoing call connection.

Figure 4:
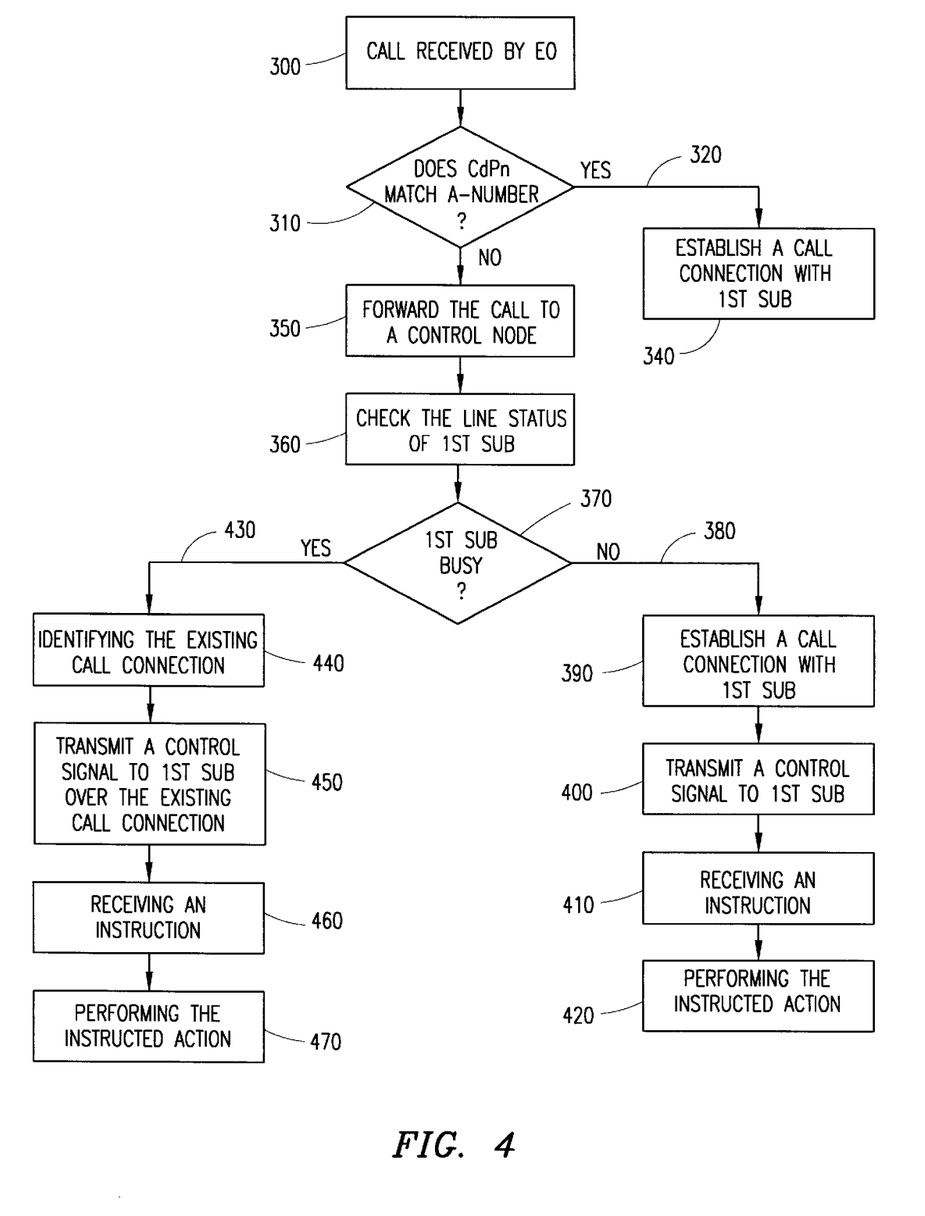
FIG. 4 is a flowchart illustrating the steps taken while providing different terminating call treatments to multiple incoming calls in accordance with the teachings of the present invention.

FIG. 4 is a flowchart illustrating the exemplary steps taken while providing different terminating call treatments to multiple incoming calls by the control node. An incoming call is initially received by the first local exchange at step 300. Since all incoming calls are always first rerouted to the control node before being connected to the destination subscriber terminal, there needs to be a mechanism for distinguishing the call setup requests received from the control node from the rest of the incoming call setup requests. Therefore, as mentioned previously, the first local exchange compares the calling party number included in the setup signal with the directory number assigned to the control node at step 310. If there is a match (decision link YES 320), the call connection is being requested by the control node and, without forwarding the received call connection request back to the control node, the first local exchange establishes a call connection with the smart terminal (step 340).

However, if the call connection request is received from a calling party other than the control node (decision link NO 330), the first local exchange forwards the received call connection to the control node in step 350. The control node determines the line status of the smart terminal associated with the calling party number at step 360. After determining that the line status of the calling party is not busy (step 370 and decision link NO 380), the control node establishes a call connection through the first local exchange to the smart terminal (step 390). As described previously in FIG. 3, a new call leg is established between the control node and the first local exchange. The first local exchange then establishes another call leg towards the smart terminal. After establishing a call connection with the smart terminal, the control node transmits control data informing the smart terminal of the received incoming call at step 400. Such control data include the calling party number and available subscriber features. The encoder/decoder within the control node receives an instruction back from the smart terminal, and the control node accordingly provides the instructed call treatment to the receiving incoming call at step 420. As previously described, such treatments include establishing a speech connection between the calling party terminal and the smart terminal. Another includes disconnecting the call connection between the first local exchange and the smart terminal and forwarding the received incoming call to a forward-to-number. Yet, another example includes disconnecting the call connection between the first local exchange and the smart terminal and connecting the incoming call with a voice mail device.

Referring back to the line status determination at step 370, if the smart terminal is already engaged in a call connection (decision link YES 430), the control node identifies the existing call connection connected to the smart terminal at step 440. Utilizing the existing call connection, the control node transmits control data informing the smart terminal of the received incoming call at step 450. Again using the existing call connection, a user instruction is received by the control node at step 460. The control node then provides the instructed call treatment to the received incoming call. The user may have instructed the control node to allow the received incoming call to call-wait on the existing call connection. In that particular case, the CAW module associated with the control node generates the call waiting tone on the existing speech connection and allows the subscriber to place the existing call connection on hold at 470. This would enable the smart terminal to answer the second incoming call. If the user wants to forward the call, the CFB module associated with the control node forwards the call by generating another IAM signal with a pre-assigned forward-to-number at step 470.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for providing different terminating call treatments for an incoming call towards a subscriber terminal, said subscriber terminal being served by a local exchange and currently connected to a first call connection, said method comprising the steps of:

receiving, at said local exchange, an incoming call towards said connected subscriber terminal;

invoking, by said local exchange in response to the receipt of said incoming call, a control module associated with said local exchange;

transmitting, via out-of-band tones, first control data over said first call connection established between said local exchange and said subscriber terminal, said control data informing said subscriber terminal of the existence of said incoming call;

receiving, via said out-of-band tones, second control data from said subscriber terminal over said first call connection, said second control data including an instruction to said control module for subscriber service treatment of said incoming call; and providing one of said different call treatments to said incoming call as indicated by said received instruction, wherein said first and second control data are transmitted concurrently and in parallel with voice data across said first call connection.

2. The method of claim 1 wherein said control module comprises a telecommunications node connected to said local exchange.

3. The method of claim 2 wherein said telecommunications node comprises a Service Switching Point (SSP).

4. The method of claim 2 wherein said step of invoking said control module further comprises the step of forwarding said incoming call to said telecommunications node.

5. The method of claim 1 wherein said first control data includes a calling party number associated with said incoming call.

6. A telecommunications system for selectively providing one of a plurality of different terminating call treatments for an incoming call towards a subscriber terminal, said subscriber terminal being currently connected to a first call connection, said system comprising:

a control module for providing different call treatments to said connected subscriber terminal; and a local exchange serving said subscriber terminal and being associated with said control module, said local exchange comprising:

means for receiving an incoming call towards said subscriber terminal; and means for invoking said control module associated with said local exchange, said control module further comprising:

means for transmitting first control data to said subscriber terminal over said first call connection using out-of-band tones, said control data informing said subscriber terminal of said incoming call;

means for receiving second control data from said subscriber terminal over said first call connection using said out-of-band tones, said second control data including an instruction from said subscriber terminal to said control module indicating the selected one of said plurality of different terminating call treatments to be given to said incoming call by said control module; and means for providing said selected treatment to said incoming call in accordance with said received instruction, wherein said first and second control data are transmitted concurrently and in parallel with voice data across said first call connection.

7. The system of claim 6 wherein said control module comprises a telecommunications node connected to said local exchange.

8. The system of claim 7 wherein said telecommunications node comprises a Service Switching Point (SSP).

9. The system of claim 7 wherein said means of invoking said control module further comprises the means for rerouting said incoming call to said telecommunications node.

10. The system of claim 9 wherein said incoming call includes a calling party number and said telecommunications node is assigned a directory number, wherein said means for rerouting said incoming call to said telecommunications node further comprises means for rerouting said incoming call if said calling party number does not match said directory number assigned to said telecommunications node.

11. The system of claim 6 wherein said control data includes a calling party number associated with said incoming call.

12. The system of claim 6 wherein said telecommunications terminal further comprises:

means for receiving said first control data transmitted from said control module over said call connection;

a display unit for displaying said received control data; and means for receiving an indication from a subscriber associated with said telecommunications terminal; and means for transmitting said received indication over said call connection to said control module.

13. A method for providing a plurality of subscriber features to a first subscriber, said method comprising the steps of:

receiving, at a local exchange for said first subscriber, a first call to said first subscriber;

invoking, by said local exchange in response to the receipt of said first call, a control module for controlling said plurality of subscriber features;

establishing, by said control module, a call connection with said first subscriber;

transmitting, by said control module, a first control signal over said call connection to said first subscriber, said first control signal comprising out-of-band tones and informing said first subscriber of said first call;

receiving, by said control module in response to said first control signal, a second control signal from said first subscriber over said call connection, said second control signal comprising out-of-band tones and including a first instruction from said first subscriber for a subscriber service treatment of said first call by said control module;

providing at least one of said subscriber features as indicated by said first subscriber in said first instruction;

receiving, at said local exchange, at least one other call to said first subscriber during said call connection with said first call;

invoking, by said local exchange in response to the receipt of said at least one other call, said control module;

transmitting, by said control module, at least one other control signal over said call connection using out-of-band tones and informing said first subscriber of said at least one other call;

receiving, by said control module in response to said at least one other control signal, at least one another control signal from said first subscriber over said call connection, said at least one another control signal comprising out-of-band tones and including at least one other instruction from said first subscriber for subscriber service treatment of said at least one other call; and providing at least one of said subscriber features as indicated by said first subscriber in said at least one other instruction, wherein said first, second, at least one other, and at least one another control signals are transmitted concurrently and in parallel with voice data across said call connection.

14. The method of claim 13, wherein at least one of said control signals is transmitted via packets.

15. The method of claim 13, wherein said control module comprises a telecommunications node connected to said local exchange.

16. The method of claim 15, wherein said step of invoking said control module further comprises the step of forwarding said first call to said telecommunication node.

17. The method of claim 16 wherein said step of establishing said call connection with said first subscriber further comprises the step of:

establishing a first connection leg from said local exchange to said telecommunications node;

establishing a second connection leg from said telecommunications node to said local exchange, said second connection leg being connected to said first connection leg; and establishing a third connection leg from said local exchange to said first subscriber, said third connection leg being connected to said second connection leg.

* * * * *

UNITED STATES PATENT AND TRADEMARK OFFICE
CERTIFICATE OF CORRECTION

PATENT NO. : 6,157,640
DATED : December 5, 2000
INVENTOR(S) : Eric Lee Valentine It is certified that error appears in the above-identified patent and that said Letters Patent is hereby corrected as shown below:

Column 4,
Line 49, replace "CAWT" with -- CAW --

Column 5,
Line 54, replace "this" with -- the --

Signed and Sealed this

Thirtieth Day of October, 2001

*Attest:*

*Attesting Officer*

NICHOLAS P. GODICI
*Acting Director of the United States Patent and Trademark Office*